Patented Aug. 10, 1954

2,686,189

UNITED STATES PATENT OFFICE 2,686,189

21-CHLOROPREGNANE-3,11,20-TRIONE-17α-OL AND PROCESS

Raymond O. Clinton, North Greenbush, N. Y., assignor to Sterling Drug Inc., New York, N. Y., a corporation of Delaware No Drawing. Application May 12, 1953, Serial No. 354,653

3 Claims. (Cl. 260—397.45)

This invention relates to a new chemical compound, 21-chloropregnane-3,11,20-trione-17α-ol, having the structural formula

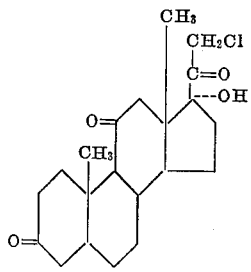

and to a method for its preparation. This compound is useful as an intermediate in the preparation of adrenal cortical hormones. In a few steps it can be converted into the important hormone known as cortisone.

21-chloropregnane-3,11,20-trione-17α-ol is prepared by oxidation of 21-chloropregnane-11,20-dione-3,17α-diol. The starting material can be either 21-chloropregnane-11,20-dione-3β,17α-diol or 21-chloropregnane-11,20-dione-3α,17α-diol, which compounds can be prepared by the method described in the copending application of W. S. Johnson and R. O. Clinton, Serial No. 253,012, filed October 24, 1951, now abandoned.

The conversion of 21-chloropregnane-3,11,20-trione-17α-ol to cortisone is accomplished by halogenating the former to produce a 4-halo-21-chloropregnane-3,11,20-trione-17α-ol, treating the 4-halo-21-chloropregnane-3,11,20-trione-17α-ol with hydrazine or a substituted hydrazine to remove the elements of hydrogen halide from the 4- and 5-positions, hydrolyzing the resulting hydrazone of 21-chloro-4-pregnene-3,11,20-trione-17α-ol to 21-chloro-4-pregnene-3,11,20-trione-17α-ol, and treating the latter with a metallic acetate to produce cortisone acetate. The 4-halo-21-chloropregnane-3,11,20-trione-17α-ols and their preparation are described in the prior copending application of R. O. Clinton, Serial No. 285,069, filed April 29, 1952. The present application is a continuation-in-part of copending R. O. Clinton application, Serial No. 259,510, filed December 1, 1951, now abandoned.

The oxidation of 21-chloropregnane-11,20-dione-3,17α-diol is carried out by treating it with an oxidizing agent selected from the group consisting of an N-bromoamide, a hexavalent chromimum compound, and a low molecular weight ketone in combination with an aluminum alkoxide. The N-bromoamide is the N-bromo derivative of a lower-fatty acid amide such as N-bromoacetamide or N-bromopropionamide, or the N-bromo derivative of an imide of a dicarboxylic acid such as N-bromosuccinimide or N-bromophthalimide. The hexavalent chromium compound can be chromic oxide ($CrO_3$) or a salt of chromic acid which produces chromic acid under acid conditions. The low molecular weight ketone is usually acetone and the aluminum alkoxide is the aluminum salt of a lower alkanol, such as aluminum isopropoxide or aluminum tertiary-butoxide.

N-bromoacetamide is a preferred oxidizing agent for the oxidation of 21-chloropregnane-11,20-dione-3,17α-diol. A nearly quantitative conversion to 21-chloropregnane-3,11,20-dione-17α-ol can be effected by mixing the 3-hydroxy compound in an inert solvent with at least an equimolar amount of N-bromoacetamide in the cold.

Example

A solution of 7.66 g. (0.020 mole) of 21-chloropregnane-11,20-dione-3α,17α-diol, M. P. 194–195.5° C., $[\alpha]_D^{25} = +84°$ (1% in chloroform), in 70 ml. of tertiary-butyl alcohol was warmed to about 50° C., 3.0 ml. of water was added thereto, and the solution was cooled to 10° C. N-bromoacetamide (2.97 g., 0.021 mole, of 97.6% purity) was then added and the mixture was stirred at 10° C. for five hours. The mixture was colorless at first but gradually developed a deep orange color, and a crystalline precipitate appeared after about two and one-half hours. After the five hour period, the mixture was slowly diluted with 480 ml. of water, stirred at 0° C. for two hours, and the precipitate was collected by filtration, washed with 200 ml. of water and dried, giving 7.415 g. (97.4%) of 21-chloropregnane-3,11,20-trione-17α-ol, M. P. 232–236° C. (with decomposition). This material was dissolved in about 250 ml. of acetone, and the solution was filtered, concentrated to 75 ml. and diluted with 75 ml. of ether. The crystalline precipitate was separated, recrystallized from 350 ml. of 95% alcohol, and dried at 100° C. for seven hours, giving 21-chloropregnane-3,11,20-trione-17α-ol, M. P. 248.7–250.5° C. (with decomposition), optical rotation $[\alpha]_D^{25} = +93.7°$ (1% in acetone).

*Analysis.*—Calcd. for $C_{21}H_{29}ClO_4$: C, 66.21; H, 7.67. Found: C, 66.14; H, 7.40.

I claim:

1. 21 - chloropregnane - 3,11,20 - trione - 17α-ol having the formula

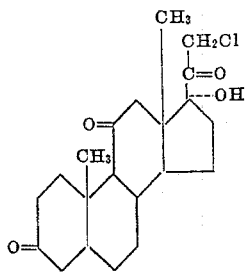

2. The process for preparing 21-chloropregnane-3,11,20-trione-17α-ol which comprises oxidizing 21-chloropregnane-11,20-dione-3,17α-diol with an oxidizing agent selected from the group consisting of an N-bromoamide, a hexavalent chromium compound, and a low molecular weight ketone in combination with an aluminum alkoxide.

3. The process for preparing 21-chloropregnane-3,11,20-trione-17α-ol which comprises oxidizing 21-chloropregnane-11,20-dione-3,17α-diol by mixing it with at least an equimolar amount of N-bromoacetamide in an inert solvent.

No references cited.